US011869038B2

(12) United States Patent
Bjordammen

(10) Patent No.: US 11,869,038 B2
(45) Date of Patent: Jan. 9, 2024

(54) TRACKING AD PREFERENCES IN ADAPTIVE BIT RATE SYSTEMS

(71) Applicant: ARRIS Enterprises, Inc., Suwanee, GA (US)

(72) Inventor: David M. Bjordammen, Blue Bell, PA (US)

(73) Assignee: ARRIS Enterprises LLC, Suwanee, GA (US)

(*) Notice: Subject to any disclaimer, the term of this patent is extended or adjusted under 35 U.S.C. 154(b) by 64 days.

(21) Appl. No.: 14/313,235

(22) Filed: Jun. 24, 2014

(65) Prior Publication Data

US 2015/0371280 A1 Dec. 24, 2015

(51) Int. Cl.
| | |
|---|---|
| *G06Q 30/00* | (2023.01) |
| *G06Q 30/0251* | (2023.01) |
| *H04L 67/02* | (2022.01) |
| *H04L 65/80* | (2022.01) |
| *H04L 65/65* | (2022.01) |
| *H04L 65/75* | (2022.01) |
| *H04L 67/53* | (2022.01) |
| *H04L 67/50* | (2022.01) |

(52) U.S. Cl.
CPC ......... *G06Q 30/0269* (2013.01); *H04L 65/65* (2022.05); *H04L 65/765* (2022.05); *H04L 65/80* (2013.01); *H04L 67/02* (2013.01); *H04L 67/53* (2022.05); *H04L 67/535* (2022.05)

(58) Field of Classification Search
CPC ........... G06Q 30/0244; G06Q 30/0251; G06Q 30/0255; G06Q 30/0269; G06Q 30/0272; H04N 21/812; H04L 29/06027; H04L 47/10

USPC ......... 705/14.43, 14.49, 14.53, 14.66, 14.68; 725/32, 34–36; 709/213, 233
See application file for complete search history.

(56) References Cited

U.S. PATENT DOCUMENTS 7,584,490 B1 * 9/2009 Schlack ............. H04N 21/2668
725/138
7,806,329 B2 * 10/2010 Dmitriev ............ G06Q 30/0269
235/375

(Continued)

FOREIGN PATENT DOCUMENTS

| WO | WO-2075482 A2 * | 9/2002 | |
| WO | WO-2085016 A1 * | 10/2002 | |
| WO | WO-2010019793 A2 * | 2/2010 | ........... G06F 3/0483 |

OTHER PUBLICATIONS

* CISCO. "Next Generation Video Services Fundamentals." (Nov. 15, 2010). Retrieved online Jun. 30, 2022. https://www.cisco.com/c/dam/global/en_ca/assets/plus/assets/pdf/CiscoPlus-Next-Generation-Video-Services-Fundamentals-PCHAVE.pdf (Year: 2010).*

(Continued)

*Primary Examiner* — James A Reagan
(74) *Attorney, Agent, or Firm* — Chernoff, Vilhauer, McClung & Stenzel, LLP

(57) ABSTRACT

An adaptive bit rate system uses adaptive streaming to deliver content to client devices capable of adaptive bit rate streaming. Techniques for advertisement management include monitoring ad skipping by an adaptive bit rate client device that receives media chunks from the adaptive bit rate system. Techniques include monitoring a client action or inaction as it relates to advertisement skipping for future advertisement selections.

15 Claims, 6 Drawing Sheets

(56) References Cited

U.S. PATENT DOCUMENTS

| | | | | |
|---|---|---|---|---|
| 8,190,674 B2* | 5/2012 | Narayanan | H04N 21/23805 | 709/217 |
| 8,219,711 B2* | 7/2012 | Visharam | H04N 21/47202 | 709/246 |
| 8,370,520 B2* | 2/2013 | Kohli | H04L 65/752 | 370/352 |
| 8,392,615 B2* | 3/2013 | Visharam | H04N 21/85406 | 709/246 |
| 8,489,760 B2* | 7/2013 | Visharam | H04L 65/80 | 709/224 |
| 8,683,066 B2* | 3/2014 | Hurst | H04L 65/70 | 375/240 |
| 8,745,262 B2* | 6/2014 | Kohli | H04L 65/762 | 370/352 |
| 8,855,470 B2* | 10/2014 | Stern | H04N 21/2541 | 386/249 |
| 8,887,215 B2* | 11/2014 | Fisher | H04N 21/2662 | 725/32 |
| 9,043,484 B2* | 5/2015 | Manzari | H04L 65/70 | 709/231 |
| 9,049,494 B2* | 6/2015 | Dhruv | H04N 21/6543 | |
| 9,082,092 B1* | 7/2015 | Henry | G06Q 10/06 | |
| 9,137,278 B2* | 9/2015 | Strasman | H04L 29/06 | |
| 9,189,806 B2* | 11/2015 | Manzari | H04N 21/2662 | |
| 9,344,748 B2* | 5/2016 | Lam | H04N 21/845 | |
| 9,374,604 B2* | 6/2016 | Nemiroff | H04N 21/2335 | |
| 9,414,100 B2* | 8/2016 | Van Veldhuisen | H04N 21/845 | |
| 9,537,920 B2* | 1/2017 | Tarbox | H04L 65/75 | |
| 9,621,928 B2* | 4/2017 | Manzari | H04L 65/1101 | |
| 9,668,007 B2* | 5/2017 | Van Veldhuisen | H04N 21/647 | |
| 9,998,775 B2* | 6/2018 | Tarbox | H04N 21/2387 | |
| 10,116,722 B2* | 10/2018 | Hurst | H04N 21/2662 | |
| 10,165,034 B2* | 12/2018 | Hurst | H04N 21/23439 | |
| 10,911,795 B2* | 2/2021 | Parks | H04N 21/8456 | |
| 10,979,473 B2* | 4/2021 | Hurst | H04N 21/4331 | |
| 2007/0204310 A1* | 8/2007 | Hua | H04N 7/17318 | 725/88 |
| 2009/0043906 A1* | 2/2009 | Hurst | H04N 21/23439 | 725/40 |
| 2009/0172723 A1* | 7/2009 | Shkedi | H04N 5/76 | 725/32 |
| 2010/0131671 A1* | 5/2010 | Kohli | H04L 65/762 | 709/233 |
| 2010/0235438 A1* | 9/2010 | Narayanan | H04L 65/612 | 709/203 |
| 2010/0235542 A1* | 9/2010 | Visharam | H04N 21/6587 | 709/246 |
| 2011/0246661 A1* | 10/2011 | Manzari | H04L 65/612 | 709/231 |
| 2012/0042090 A1* | 2/2012 | Chen | H04L 65/607 | 709/231 |
| 2012/0254456 A1* | 10/2012 | Visharam | H04L 65/762 | 709/231 |
| 2012/0263434 A1* | 10/2012 | Wainner | H04N 21/812 | 386/E5.003 |
| 2012/0311177 A1* | 12/2012 | Visharam | H04N 21/6587 | 709/233 |
| 2013/0132504 A1* | 5/2013 | Kohli | H04L 65/752 | 709/213 |
| 2013/0311670 A1* | 11/2013 | Tarbox | H04N 21/8456 | 709/231 |
| 2013/0332971 A1* | 12/2013 | Fisher | H04N 21/8456 | 725/93 |
| 2014/0040026 A1* | 2/2014 | Swaminathan | G06Q 30/02 | 705/14.53 |
| 2014/0109153 A1* | 4/2014 | Venkatraman | H04N 21/2343 | 725/62 |
| 2014/0207966 A1* | 7/2014 | Hurst | H04N 21/84 | 709/231 |
| 2014/0236953 A1* | 8/2014 | Rapaport | G06Q 10/10 | 707/740 |
| 2014/0281010 A1* | 9/2014 | Panje | H04L 65/60 | 709/231 |
| 2015/0201042 A1* | 7/2015 | Shah | H04L 65/60 | 709/219 |
| 2015/0278884 A1* | 10/2015 | Manzari | H04L 65/70 | 705/14.73 |
| 2015/0281746 A1* | 10/2015 | Lam | H04N 21/23605 | 725/116 |
| 2015/0281751 A1* | 10/2015 | Nemiroff | H04N 21/23602 | 725/116 |
| 2015/0281752 A1* | 10/2015 | Van Veldhuisen | H04N 21/233 | 725/116 |
| 2015/0371280 A1* | 12/2015 | Bjordammen | G06Q 30/0269 | 705/14.66 |
| 2016/0029051 A1* | 1/2016 | Manzari | G06Q 30/0277 | 725/36 |
| 2016/0316235 A1* | 10/2016 | Van Veldhuisen | H04N 21/2335 | |
| 2017/0150190 A1* | 5/2017 | Tarbox | H04N 21/23805 | |
| 2017/0366594 A1* | 12/2017 | Hurst | H04N 21/8456 | |
| 2019/0082000 A1* | 3/2019 | Hurst | H04L 65/70 | |
| 2020/0128284 A1* | 4/2020 | Parks | H04N 21/858 | |
| 2021/0234913 A1* | 7/2021 | Hurst | H04N 21/8456 | |

OTHER PUBLICATIONS

• Thomas Stockhammer. "Dynamic adaptive streaming over HTTP: Standards and design principles." (Feb. 2011). Retrieved online Jun. 30, 2022. https://www.researchgate.net/publication/221636646_Dynamic_adaptive_streaming_over_HTTP_Standards_and_design_principles/link/0deec52eb8ab3bf3ed000000/download (Year: 2011).*

• Ted D. Monchamp. "Adaptive Bit-Rate Streaming—Minimizing End-User Buffer Times in Real-Time Video Delivery." (2013). Retrieved online Jun. 30, 2022. https://www2.rivier.edu/journal/ROAJ-Fall-2013/J789-Monchamp_bit-rate-streaming.pdf (Year: 2013).*

JP Colaco, "The Power of Choice in Advertising", Hulu, retrieved from <http://blog.hulu.com/2011/10/03/the-power-of-choice-in-advertising/>, Oct. 3, 2011.

J. Titlow, "Viewer-Selected Ads on Hulu Perform Better Than Random Ones", Readwrite, retrieved from <http://readwrite.com/2011/10/03/hulu_ad_swap_ads_better_than_random_ads>, Oct. 3, 2011.

* cited by examiner

TRACKING AD PREFERENCES IN ADAPTIVE BIT RATE SYSTEMS

BACKGROUND

Advertisement revenue is often critical to the financial viability of an enterprise that distributes multimedia. An internet protocol video delivery network based on adaptive streaming techniques can provide many advantages over traditional cable delivery systems, such as greater flexibility, reliability, lower integration costs, new services, and new features. In various ways for a number of years, video network operators have tried to provide more salient ad content to subscribers, allowing the operator to more highly monetize ad content.

However, solutions for effective advertising developed for traditional cable distribution networks and architectures are not suitable for, or have deficiencies when, deployed in the internet protocol video delivery network architectures modified for adaptive bit rate streaming. In all ad supported video networks, the operator is able to better monetize the content if more relevant ad content is offered to the subscriber.

Thus, more effective advertisement solutions in an adaptive bit rate system are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

Figure 1A:
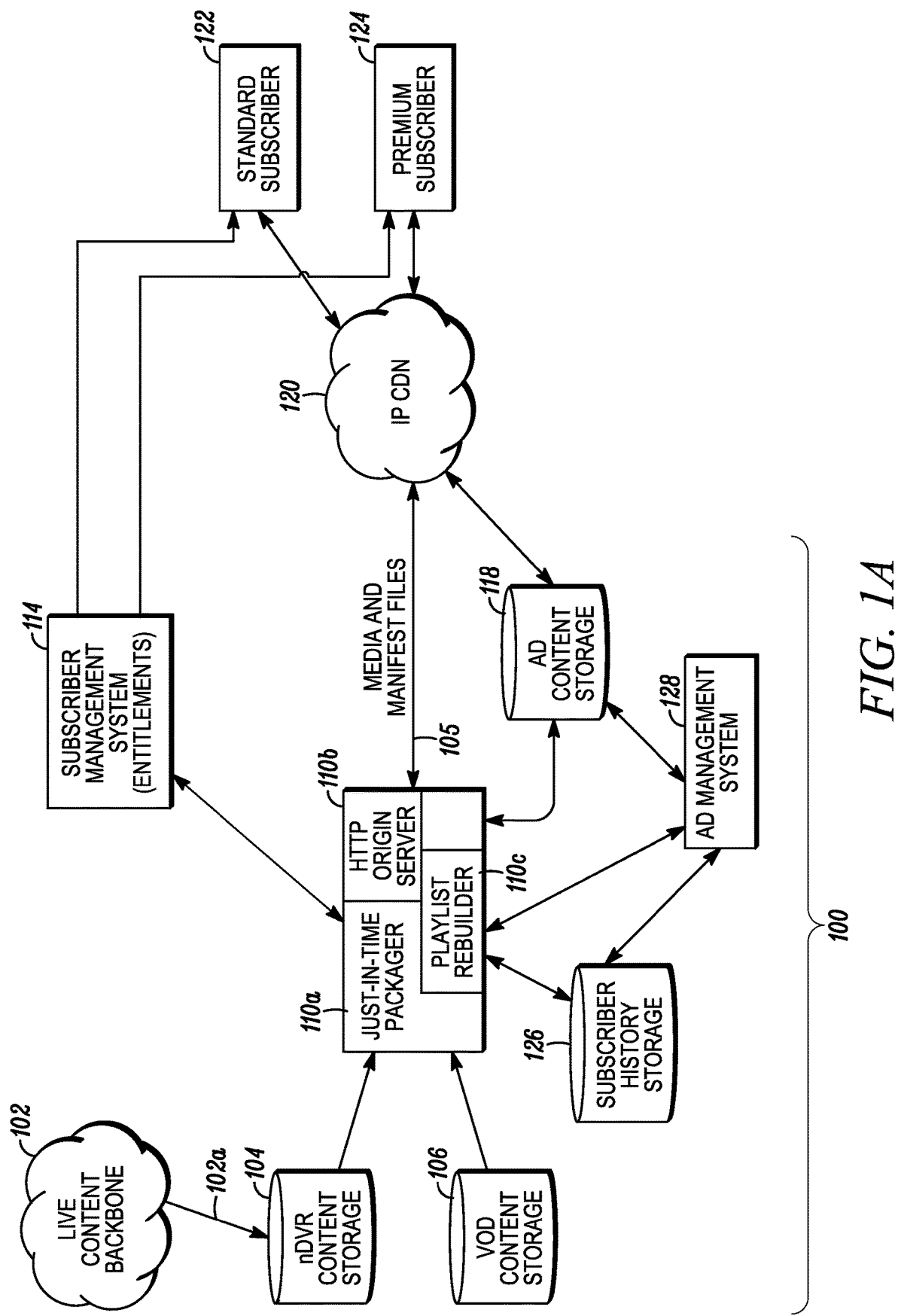
FIG. 1A illustrates the main components of an example ABR system with features for ad management.

It is noted that while the accompanying FIGS. serve to illustrate embodiments of concepts that include the claimed invention, and explain various principles and advantages of those embodiments, the concepts displayed are not necessary to understand the embodiments of the present invention, as the details depicted in the FIGS. would be readily apparent to those of ordinary skill in the art having the benefit of the description herein.

DETAILED DESCRIPTION

Targeted advertising has moved from geographic ad targeting, to targeting based more on demographics. Running counter to these efforts to target and monetize ads is the growing capability of subscribers to skip ads altogether, particularly when viewing DVR recorded programming. Disclosed herein are techniques for tracking a given subscriber's ad preferences on ABR clients based on which ads he/she watches as opposed to skips, and using that information to more intelligently place ads of interest to that subscriber.

ABR delivery networks are potentially more prone to DVR-style ad skipping. Efforts have been made to limit or prevent ad skipping using network side methods or preventing ad skipping using a trusted or cooperating client. However, while avoiding the skipping of ads may be desirable in some instances, there may be a loss of information gathering potential for network operators if ad skipping is suppressed entirely or there is no ability to track ads skipped.

Better ad targeting offers benefits to both the operator, e.g., better revenue from ads viewed, and for the subscriber, e.g., more relevant ad content. Previous efforts for targeted advertisement use intrusive techniques, such as requesting user information or requiring user action to select an ad from provided choices. For example, a tablet client device may have a touch screen for making an on-screen selection between one of three ad choices. However, many client devices are not equipped for an interface that allows convenient user action to be taken, such as a television that requires a remote control for issuing it commands. Methods that are too probing or invasive will tend to turn off the subscriber.

Embodiments disclosed include techniques for more effectively tracking ad preferences and targeting ads to individual subscribers by tracking the user's habits related to skipping or attempts to skip ads. As disclosed, embodiments are described for effectively compelling the subscriber to watch a minimum of relevant ads, but determining the ads to deliver to the user in a manner than is minimally invasive to the subscriber. As described in more detail, embodiments include intelligently manipulating manifest files in an ABR network delivery system to address ad skipping, enabling the subscriber the ability to skip individual ads, one at a time. The system keeps track of which ads where skipped and which were watched. Using this information the system is able to learn about the subscriber's ad preferences and is then able to supply more relevant ads to the subscriber. As described below, embodiments include those with aspects of network control for manipulating manifest files generated by a packager to manipulate the access to and delivery of the adaptive bit rate media segments to adaptive bit rate client devices.

FIG. 1A illustrates the main components of an example ABR system with features for ad management. FIG. 1A depicts a high level illustration of a representative adaptive bit rate system 100 that delivers content to adaptive bit rate client devices 122 and 124 via an internet protocol content delivery network 120. An adaptive bit rate client device is a client device capable of providing streaming playback by requesting an appropriate series of segments from an adaptive bit rate system 100 over the internet protocol content delivery network (CDN) 120. The representative adaptive bit rate client devices 122 and 124 in FIG. 1A are shown associated with subscribers having different levels of subscription, a standard subscriber and a premium subscriber, respectively.

An adaptive bit rate system, such as the adaptive bit rate system 100 shown in FIG. 1A, uses adaptive streaming to deliver content to its subscribers. Adaptive streaming, also known as ABR streaming, is a delivery method for streaming video using an Internet Protocol (IP). As used herein, streaming media includes media received by and presented to an end-user while being delivered by a streaming provider using adaptive bit rate streaming methods. Streaming media refers to the delivery method of the medium rather than to the medium itself. The distinction is usually applied to media that are distributed over telecommunications networks, e.g., "on-line," as most other delivery systems are either inherently streaming (e.g., radio, television) or inherently non-streaming (e.g., books, video cassettes, audio CDs). Hereinafter, on-line media and on-line streaming using adaptive bit rate methods are included in the references to "media" and "streaming."

Figure 4:
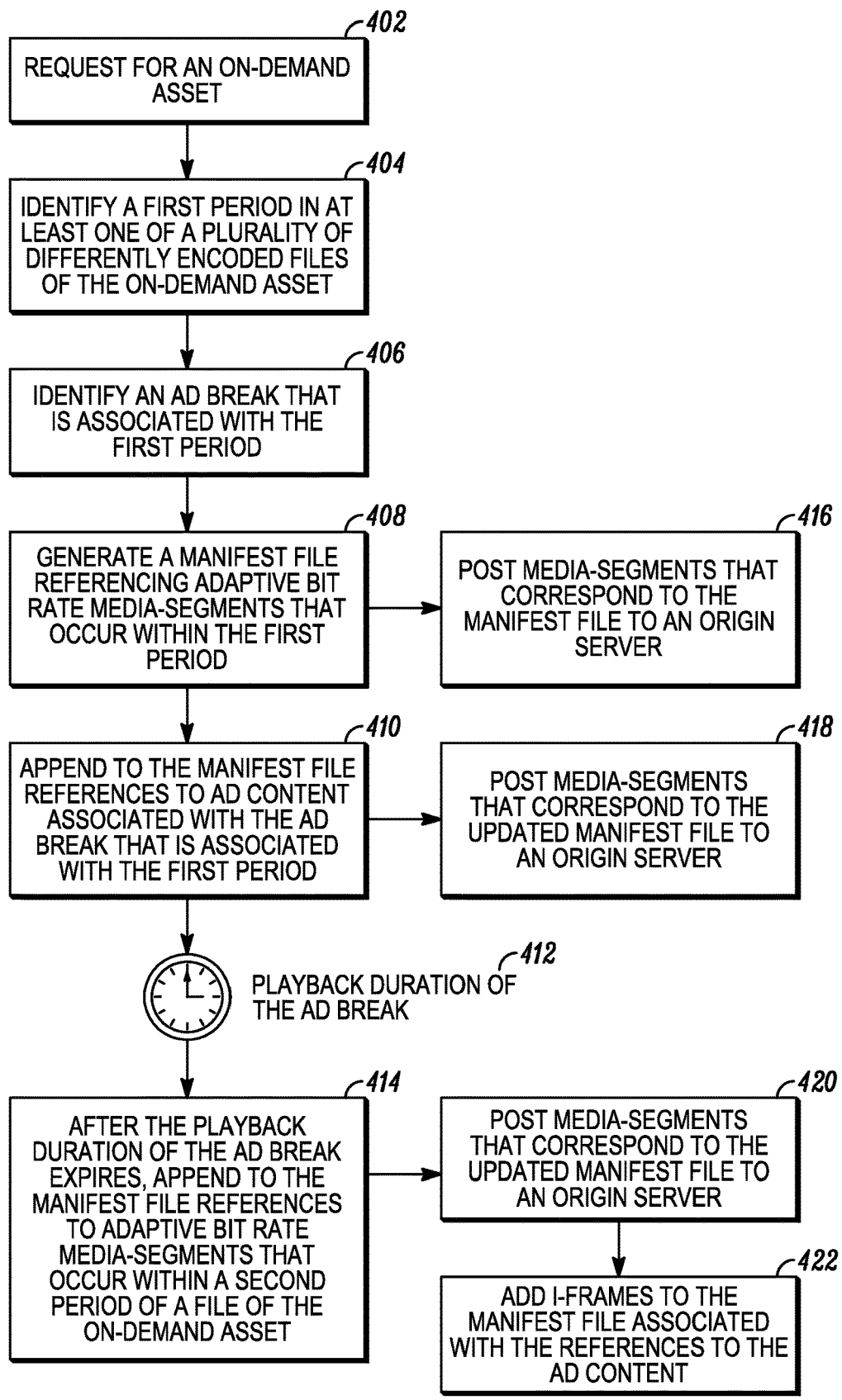
FIG. 4 depicts a flow diagram illustrating a method for preventing or minimizing ad skipping.

Adaptive bit rate streaming, discussed in more detail below with respect to FIG. 4, is a technique for streaming multimedia where the source content is encoded at multiple bit rates. It is based on a series of short progressive downloads applicable to the delivery of both live and on demand content. Adaptive bit rate streaming works by breaking the overall media stream into a sequence of small file downloads, each download loading one short segment, or chunk, of an overall potentially unbounded transport stream.

As used herein, a chunk is a small file containing a short video segment (typically 2 to 10 seconds) along with associated audio and other data. Adaptive streaming may use the Hypertext Transfer Protocol (HTTP) as the transport protocol for these video chunks. For example, 'chunks' or 'chunk files' may be short sections of media retrieved in an HTTP request by an adaptive bit rate client. In some cases these chunks may be standalone files, or may be sections (i.e. byte ranges) of one much larger file. For simplicity the term 'chunk' is used to refer to both of these cases (many small files or fewer large files).

It is desirable for the network operator of the adaptive bit rate system 100 to control the skipping of ads by subscribers from their adaptive bit rate client devices 122, 124. Such control, however, is inherently difficult in an adaptive bit rate system because 1) adaptive bit rate client devices are a wide variety of consumer products running different operating systems, often with adaptive bit rate client software that is not under control of the network operator, and 2) given the nature of the adaptive bit rate 'pull' model, where the client directly requests and retrieves media content chunks at its own pace as a function of network traffic and other factors, network components have less control over the streaming of media files compared to traditional video on demand (VOD) streaming systems (be it over QAM or IP network). The net result is the adaptive bit rate client device, which the network operator may not control, is able to dictate the pacing of content and is thus generally able to skip ads.

Further, an implication of adaptive bit rate systems is that the client has by default wide latitude with respect to its access to media chunks. The client is generally free to skip around within the asset, fast forward, rewind, pause, jump ahead, without the same control or even knowledge of the network, relative to more traditional video delivery networks (e.g. HFC/QAM-based broadcast or VOD or SDV video services). With respect to the ability to skip ad content, then, by default, the adaptive bit rate client has more freedom to skip ads than would a comparable QAM-based video client.

The example adaptive bit rate system 100 depicted in FIG. 1A includes a network digital video recorder (nDVR) content storage 104, a VOD content storage 106, a just-in-time packager 110a, HTTP origin server 110b, playlist rebuilder 110c, ad content storage 126, an ad management system 128, subscriber history storage 126, and a subscriber management system 114. The content provided to the adaptive bit rate system 100 may originate from a live content backbone 102. The adaptive bit rate system 100 provides an interface between the live content backbone 102 and the internet protocol content delivery network 120.

The components between the live content backbone 102 and the IP content delivery network 120 in the adaptive bit rate system 100 (e.g., content storage 104, 106, packager 110a, origin server 110b, playlist rebuilder 110c, and subscriber management system 114) may be located in a headend or other suitable location within a service provider's network. The content may be provided to the service provider's network from a content programmer or content provider. As used herein, generally a content provider refers to content programmers that provide media content to service providers. The service providers distribute the content to its subscribers via regional headends.

A content provider may be any entity that provides media content to a service provider for distribution to subscribers. For example, the content programmer may be the Entertainment and Sports Programming Network (ESPN)®, which creates media content by televising sporting events and developing television programs, movies, etc. Similarly, the Turner Broadcasting System (TBS)®, is another example of a programmer, which also broadcasts media content, such as television programs, sporting events, and movies.

A cable television headend is a master facility in the service provider's network for receiving content signals from a content provider for processing and distributing content over a cable television system. The headend typically is a regional or local hub that is part of a larger service provider distribution system, such as a cable television distribution system. An example is a cable provider that distributes television programs to subscribers, often through a network of headends or nodes, via radio frequency (RF) signals transmitted through coaxial cables or light pulses through fiber-optic cables. In embodiments, content is received at the headend from a content source in the content provider's network (such as a content server of a program provider).

References to a service provider, the service provider's network, and service provider's domain are used herein interchangeably to describe the service provider or entities using an infrastructure in the domain of the service provider for delivering media content from the content programmers to users, e.g., subscribers. The service provider network includes the infrastructure in the service provider's domain that receives a media content stream from the content programmer and transmits the media content stream to end-users or subscribers. In this regard, the service provider may, for instance, be a multiple service operator (MSO) network, telecommunications company, or satellite broadcaster, which includes, for example, local cable companies, such as Verizon®, Cox®, Comcast®, etc., and satellite media companies, such as DirecTV®, Dish Network®, etc.

The ad content storage device 118 represents local ad content or ad content available from an ad content provider. An ad content provider, for example, may be controlled by the internet protocol TV network provider and/or may be managed separately from the IP network or service provider. The subscriber history storage 126 and ad management system 128 may be managed by the same entity that manages the playlist rebuilder 110c. As described in more detail below, the interface between the subscriber history storage 126 and ad management system 128 enables access to a subscriber's history when choosing ads for a given subscriber. The interface between the playlist rebuilder 110c in the packager and the ad management system 128 may be based on a standard protocol, e.g., SCTE-130.

In embodiments, the service provider or MSO controls all of the network side components, including the playlist rebuilder (PLR) and the ad management system (AMS). Thus, embodiments are described in a context in which the application in a client device itself is not controlled by the MSO (service provider), but everything on the network side is under control of the MSO. Thus, while certain components are shown separately in FIG. 1A, it should be understand that the network side components may be under common control, e.g., the PLR and the ad management system are shown as separate components not due to differences of control (i.e. MSO or not) but because the functions may be partitioned separately in the manner shown.

It is noted that the playlist rebuilder 110c and just-in-time packager 110a may identify in real time which ads a client watches and which ads the client skips. The playlist rebuilder 110c and just-in-time packager 110a writes the ad watch history for a subscriber to the subscriber history storage 126. The history 126 can then be accessed by the ad management system 128 to determine which ads to select for a particular subscriber.

Embodiments disclosed herein may be configured for common copy nDVR purposes. With common copy, there is no just-in-time packager (the actual media chunks/segments are packaged independent of specific clients) but there are still client specific PLR function going on the target ads to specific clients. The figures include representation for the common copy case.

The adaptive bit rate system 100 receives content from a content source represented by the live content backbone 102. The live content backbone 102 represents any number of possible cable or service provider networks and manners for distributing content (e.g., satellite, fiber, the Internet, etc.). The example live content backbone 102 is a non-limiting example of a content source for adaptive bit rate streaming, which may include any number of multiple service operators (MSOs) or Telcos, such as cable and broadband service providers who provide both cable and Internet services to subscribers, and operate content delivery networks in which Internet Protocol (IP) is used for delivery of television programs (i.e., IPTV) over a digital packet-switched network.

When a subscriber requests content from a respective adaptive bit rate client device 122, 124, the content may be retrieved from any one of the live content backbone 102, network digital video recorder (nDVR) content storage 104, or video on demand (VOD) content storage 106. The live content backbone 102 may be the source of the content 102b that is made available at the headend via VOD content storage device 106 or nDVR content storage device 104. Accordingly, a subscriber may request a video on demand asset or a network DVR asset over the content delivery network (CDN) 120. The adaptive bit rate system may include an interface provided to subscribers to select video or audio content.

Examples of a content delivery network 120 include networks comprising, for example, managed origin and edge servers or edge cache/streaming servers. The content delivery servers, such as edge cache/streaming server, deliver content and manifest files (e.g., via one or more wired and/or wireless telecommunication networks, not pictured) to IP subscribers 122 or 124. In an illustrative example, content delivery network 120 comprises an access network that includes communication links connecting origin servers to the access network, and communication links connecting distribution nodes and/or content delivery servers to the access network. Each distribution node and/or content delivery server can be connected to one or more adaptive bit rate client devices; e.g., for exchanging data with and delivering content downstream to the connected IP client devices. The access network and communication links of content delivery network 120 can include, for example, a transmission medium such as an optical fiber, a coaxial cable, or other suitable transmission media or wireless telecommunications. In an exemplary embodiment, content delivery network 120 comprises a hybrid fiber coaxial (HFC) network.

The adaptive bit rate client device associated with a user or a subscriber may include a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by ITU-T H.263 (MPEG-2) or ITU-T H.264/MPEG-4, Part 10, Advanced Video Coding (AVC), the upcoming High Efficiency Video Coding (HEVC) standard, and extensions of such standards, to transmit and receive digital video information more efficiently.

The network based digital video recorder (nDVR) content storage device 104 represents content stored at the network via a network based digital video recorder (nDVR) service. An nDVR video asset is stored at the provider's central location rather than at the consumer's private home. Similar to a personal video recorder at the user's home, the nDVR service allows the end user to access recorded programs at will rather than restricted to the scheduling of the live broadcast. However, an nDVR service captures, in the network on a server, real-time broadcast television which can be selected for later playback. Thus, nDVR subscribers can utilize the network for recording content, rather than requiring a local device or local storage. Recordings specifically designated for a particular client are stored in the network. The service provider may utilize a larger number of nDVR servers on which subscribers' media content may be stored. The nDVR content is similar to live content in that the content is packaged for delivery to the user in real time, but playback is expected to be after the fact.

The video on demand (VOD) content storage device 106 represents video and audio content selected by the service provider for availability to a user on demand. Similar to the nDVR service, the VOD service allows the end user to access recorded programs at will rather than restricted to the scheduling of the live broadcast. However, in contrast to content explicitly recorded via a DVR at the request of a subscriber and made available to the requesting subscriber, VOD content is stored content made available by the service provider to subscribers for viewing at their discretion. The VOD content may be available to any subscribers of the content. The service provider's video on demand library can consist of thousands of movies, network and premium television programs, sporting events, children's programming, music videos, weather information, and more.

As shown in FIG. 1A, the adaptive bit rate system 100 may deliver nDVR content or VOD content to a subscriber 122, 124 via a path that includes the just-in-time packager 110a that resources the playlist rebuilder 110c and HTTP origin server 110b. Generally, an adaptive bit rate packager, such as the just-in-time packager 110a, is responsible for preparing ("packaging") individual adaptive bit rate streams.

A packager is designed to fragment, or "chunk," media files and to encapsulate those files in a container expected by the particular type of adaptive bit rate client. Thus, a whole video may be segmented in to what is commonly referred to as chunks or adaptive bit rate fragments/segments. The adaptive bit rate fragments are available at different bit rates, each of a finite duration. The adaptive bit rate system generates or identifies the media segments of the requested media content as streaming media content. Along with the delivery of media, the packager 110a creates and delivers manifest files. As shown in FIG. 1A, the just-in-time packager 110a delivers media and manifest files 105 via an origin server 110b.

The packager creates the manifest files as the packager performs the chunking operation for each type of adaptive bit rate streaming method. In adaptive bit rate protocols, the manifest files generated may include a variant playlist and a playlist file. The variant playlist describes the various formats (resolution, bit rate, codec, etc.) that are available for a given asset or content stream. For each format, a corresponding playlist file may be provided. The playlist file identifies the media file chunks/segments that are available to the client. It is noted that the terms manifest files and playlist files may be referred to interchangeably herein. The client determines which format the client desires, as listed in the variant playlist, finds the corresponding manifest/playlist file name and location, and then retrieves media segments referenced in the manifest/playlist file.

The packager creates the manifest files to be compliant with an adaptive bit rate streaming format of the associated media and also compliant with encryption of media content under various DRM schemes. Thus, the construction of manifest files varies based on the actual adaptive bit rate protocol. Adaptive bit rate streaming methods have been implemented in proprietary formats including HTTP Live Streaming ("HLS") by Apple, Inc., and HTTP Smooth Streaming by Microsoft, Inc. adaptive bit rate streaming has been standardized as ISO/IEC 23009-1, Information Technology—Dynamic Adaptive Streaming over HTTP ("DASH"): Part 1: Media presentation description and segment formats. Although references are made herein to these example adaptive bit rate protocols, it will be recognized by a person having ordinary skill in the art that other standards, protocols, and techniques for adaptive streaming may be used.

In HLS, for example, the adaptive bit rate system 100 receives a media request from a subscriber 122, 124 and generates or fetches a manifest file to send to the subscriber's playback device in response to the request. A manifest file can include links to media files as relative or absolute paths to a location on a local file system or as a network address, such as a URI path. In HLS, an extended m3u format is used as a non-limiting example to illustrate the principles of manifest files including non-standard variants.

As described herein, the packager, such as packager 110a posts the adaptive bit rate chunks associated with the generated manifest file to an origin server, such as origin server 110b. Thus, the origin server 110b receives video or multimedia content from one or more content sources via packagers 110a. The origin server 110b may include a storage device where audiovisual content resides, or may be communicatively linked to such storage devices; in either case, the origin server 110b is a location from which the content can be accessed by the adaptive bit rate client devices 122, 124. The origin server 110b may be deployed to deliver content that does not originate locally in response to a session manager.

The origin server 110b includes components that together make up a custom playlist from the collections of chunks. For example, for chunks of AV data that each has a unique URI, the custom playlist can be a collection of URIs that make up the complete program (or as disclosed herein, the portion of the program). As will be explained herein, the custom playlist may omit or alter chunks that contain AV content that is not in compliance with a rule set applied by the filter, e.g., non-compliant AV content that is deemed objectionable in a personalized rule set.

As shown in FIG. 1A, the content delivery network (CDN) 120 can be communicatively coupled to the origin server 110b and to one or more distribution nodes and/or content delivery servers (e.g., edge servers, or edge cache/streaming servers). The subscriber, via a respective client device, is responsible for retrieving the media file 'chunks,' or portions of media files, from the origin server as needed to support the subscriber's desired playback operations. The subscriber may submit the request for content via the internet protocol content delivery network (CDN) 120 that can deliver adaptive bit rate file segments from the service provider or headend to end-user adaptive bit rate client devices.

Playback at the adaptive bit rate client device of the content in an adaptive bit rate environment, therefore, is enabled by the playlist or manifest file that directs the adaptive bit rate client device to the media segment locations, such as a series of uniform resource identifiers (URIs). For example, each URI in a manifest file is usable by the client to request a single HTTP chunk. The manifest file may reference live content or on demand content. Other metadata also may accompany the manifest file.

At the start of a streaming session, the adaptive bit rate client device 122, 124 receives the manifest file containing metadata for the various sub-streams which are available. Upon receiving the manifest file, the subscriber's client device 122, 124 parses the manifest file and determines the chunks to request based on the playlist in the manifest file. The adaptive bit rate client device 122, 124 can fetch a first media segment posted to an origin server for playback. For example, the user may use HTTP Get or Byterange requests to request media segments. Then, during playback of that media segment, the playback device may fetch a next media segment for playback after the first media segment, and so on until the end of the media content. This process continues for as long as the asset is being played (until the asset completes or the user tunes away). Note that the manifest file is continually be updated.

The use of an adaptive bit rate system that chunks media files allows the client to switch between different quality (size) chunks of a given asset, as dictated by network performance. The client has the capability by using the manifest file, to request specific fragments/segments at a specific bit rate. As the stream is played, the client device may select from the different alternate streams containing the same material encoded at a variety of data rates, allowing the streaming session to adapt to the available network data rate. For example, if, in the middle of a session, network performance becomes more sluggish, the client is able to switch to the lower quality stream and retrieve a smaller chunk. Conversely, if network performance improves the client is also free to switch back to the higher quality chunks.

Since adaptive bit rate media segments are available on the adaptive bit rate system in one of several bit rates, the client may switch bit rates at the media segment boundaries. Using the manifest file to adaptively request media segments allows the client to gauge network congestion and apply other heuristics to determine the optimal bit rate at which to request the media presentation segments/fragments from one instance in time to another. As conditions change the client is able to request subsequent fragments/segments at higher or lower bitrates. Thus, the client can adjust its request for the next segment. The result is a system that can dynamically adjust to varying network congestion levels. Often, the quality of the video stream streamed to a client device is adjusted in real time based on the bandwidth and CPU of the client device. For example, the client may measure the available bandwidth and request an adaptive bit rate media segment that best matches a measured available bit rate.

Thus adaptive bit rate streaming results in an uninterrupted user experience. The client may maintain a temporary cache of a few fragments and requests further fragments at optimally determined rates thus maintaining continuity of playback even through changing network bandwidth conditions.

The origin server 110*b* may store several chunk sizes for each segment in time. The adaptive bit rate client device predicts the available bandwidth and requests the best chunk size, e.g., using the appropriate URI. Since the client is controlling when the content is requested, this is seen as a client-pull mechanism, compared to a push mechanism where the server pushes the content. Using URIs to create the manifest file enables very simple client devices to retrieve chunks using web browser-type interfaces.

Service providers, which often includes the ABR network operators, are often motivated to prevent (or at least control to some degree) the skipping of ads (as is commonly done on on-demand content) on ad supported programming. Service providers of traditional video delivery networks do block the skipping of ads, either using special logic in proprietary client software, or via the control of video-on demand streaming servers. Also, for web based content there is some prevention of ad skipping by forcing the playback of ads before an asset can be viewed, or before the web page is fully populated. Such control, however, is inherently difficult for the service provider in an adaptive bit rate system.

With the move to the adaptive bit rate (adaptive bit rate) systems, ad skipping is likely to increase, since third party clients have more control over the video stream manipulation relative to traditional video delivery systems. As noted, it is likely that in many cases the adaptive bit rate client will be 'standard' (i.e. provided by a third party or native to the consumer device). Therefore, it is desirable to effectively manage ad skipping such that the aversion/control exists in network elements (under control of the service provider) without requiring special client behavior/cooperation, and the behaviors related to the ad skipping are monitored.

As described above, the just-in-time packager 110*a* fragments content received and the fragments and a corresponding manifest file is published to the origin server 110*b*. The content is thus available in chunks published in the origin server 110*b* that may be retrieved by a subscriber. The just-in-time packager 110*a* and origin server 110*b* may be located in the same server, on separate servers, or in different locations in the service provider's network.

The manifest file, also referred to herein as a playlist file, identifies the media chunks that a subscriber may retrieve. Included in the manifest file or in a separately available manifest file are advertisements for delivering to a subscriber. The advertisements may be delivered to the subscriber at set points in time. For example, advertisement delivery may be triggered by a determination that a particular media chunk, flagged in the manifest file, is retrieved by a subscriber.

The advertisement delivery may be triggered following an indicator that the subscriber is requesting an additional manifest file, or additional chunks from within a manifest file already provided to the subscriber. The advertisements may be delivered for a predetermined period of time following the triggering event. For example, if the ABR system 100 generates a first manifest file with content/chunks for the first half of a program, the ABR system may generate a second manifest file with the second half of the program when the user requests additional content. However, prior to delivery of the second manifest file to the subscriber, the ABR system may deliver advertisement content in response to the triggering event, i.e., the user's request for an additional manifest file associated with the same program.

The ABR system may deliver the advertisement(s) to a subscriber and monitor the user's actions or inaction following delivery of the advertisement content. For example, the ABR system may wait a predetermined amount of time before sending the second manifest file, with an assumption that the advertisement content finishes playing during that period of time. The ABR system may wait for information returned downstream from the user that indicates the advertisement has played on the client device.

The playlist rebuilder 110*c* may assist in customizing advertisement selection for delivery of targeted ads to the consumer. The playlist rebuilder communicates with an ad management system 128, as disclosed herein. The playlist rebuilder handles the mechanics of generating manifest files with advertisements identified in the manifest file or in a manifest file dedicated to the advertisement content.

The ad management system 128 identifies the available advertisements, determines which are appropriate for a particular subscriber, and indicates to the playlist rebuilder which advertisements should be associated or identified in a manifest file that is published for a particular subscriber. The playlist rebuilder 110*c* compiles the chunks for the requested media content and the advertisements as directed by the ad management system 128 in a coherent manner for delivery to the subscriber.

In embodiments, the ad management system 129 communicates with ad content storage 118. In this manner, the service provider can use the ad management system 129 to identify the advertisements available for delivery to the subscribers of the service provider's ABR network. In embodiments, the ad management system communicates with subscriber history storage 126. In this manner, the ad management system can correlate available advertisements more specifically to a subscriber based on the subscriber's history. It is noted that in embodiments, the ad management system 128 and the subscriber history storage 126 are in the service provider's network, i.e., the service provider controls and manages the ad management system 128 and subscriber history storage 126. Such embodiments function in contrast to third party managing ad content from the client device, for example.

The disclosed ad management techniques prevent the subscriber from freely skipping past or through ad breaks entirely. As described herein (or in more detail below), the ABR system 100 may employ various techniques to limit the entire skipping of advertisements. However, the AB R system 100 may employ techniques to enable controlled skipping, and using information gathered from monitoring the ad skips to better target advertisements to subscribers.

In embodiments, the playlist rebuilder 110*c* is able to communicate with the subscriber history storage 126. The playlist rebuilder 110*c* may correlate a subscriber with a particular subscriber action or inaction for compiling information about a subscriber's history. For example, the subscriber may be allowed to skip one ad at a time. If an ad is skipped, the system will offer an alternative ad to the subscriber. The ABR system may collect a history of ads that a user watched or did not watch. The history builds as the client participates in ad skipping. Unobtrusive to the user, the history is built based on the ad skipping for better matching advertisements to the client. The ABR system 100 may learn a subscriber history through ad skipping attempts, and the subscriber history may be accessed to better select advertisements for the subscriber.

Consider, for example, if a subscriber requests content. The packager 110*a* generates a manifest file up to the first advertisement break. Default ad chunks are added to the manifest file for one advertisement at a time. For purposes of example, assume the chunks used to update the manifest file are for a first advertisement, advertisement #1 related to a kitchen appliance. The chunks for the first advertisement are used to update the manifest file. No more updates are made to the manifest file until a playout time for the first advertisement has lapsed, where the playout time lapsing is a triggering event.

Once the playout time lapses, in this example, the manifest file is updated with chunks for a second advertisement or media content chunks (e.g., if the requirements associated with advertisements have been satisfied). The playlist rebuilder 110*c*, along with identifying that the playout time has lapsed and triggering the updates to the manifest file, may send information to the subscriber history storage 126 for storing an indication that the subscriber watched, or presumably watched because the advertisement was not skipped, advertisement #1 related to the kitchen appliance. Because the history added to the subscriber history storage 126 in this example is based on user inaction (i.e., not a discernable action on the part of the subscriber to skip the ad, but instead the subscriber's inaction during the playout time), a lesser weight may be associated between the user and this advertisement (or to this category of advertisement, or some other advertisement selection criteria that correlates the subscriber with the advertisement).

Instead of the playout time lapsing in the example above, assume the subscriber skipped advertisement #1. The playlist rebuilder 110*c* can capture the subscriber's action. In embodiments, the playlist rebuilder 110*c* can identify whether or not the subscriber pulled the content for advertisement one. In embodiments, the playlist rebuilder 110*c* can identify the request to skip the advertisement based on a request for an additional chunk of content/advertisement prior to the time it would have taken for the advertisement to play out on the client device. The playlist rebuilder 110*c* can provide the correlation between the action and subscriber to the subscriber history storage 126.

Thus, the information provided to the subscriber history storage 126 from the playlist rebuilder 110*c* provides monitoring tools not previously available in an ABR system for targeted advertisements. For example, the manipulation of playlist files that prevents a subscriber from skipping through ads may be extended to allow a limited level of ad skipping such that one ad at a time may be skipped. When an ad is skipped an alternate ad may be offered to the subscriber in its place. Thus, individual ads can be skipped (ads that are not of interest), but other ads must be watched in place of the skipped ones. In a given break between updates to the manifest file, the subscriber is effectively required to retrieve content for a minimum number of ads in a given ad break.

Ad rules may be imposed for determining how the ad break is managed. The service provider may implement ad rules, for example. In embodiments, an ad rule may require that three entire advertisements must be watched before the manifest file will be updated with additional programming content. In embodiments, an ad rule requires that a certain amount of time pass before the manifest file will be updated with additional programming content, regardless of how many skips occur during the ad break. In embodiments, the manifest file will be updated with additional programming content once a predefined number of skips have been taken. In embodiments, instead of skipping one ad at a time, multiple ads may be viewed or skipped at a time.

Figure 1B:
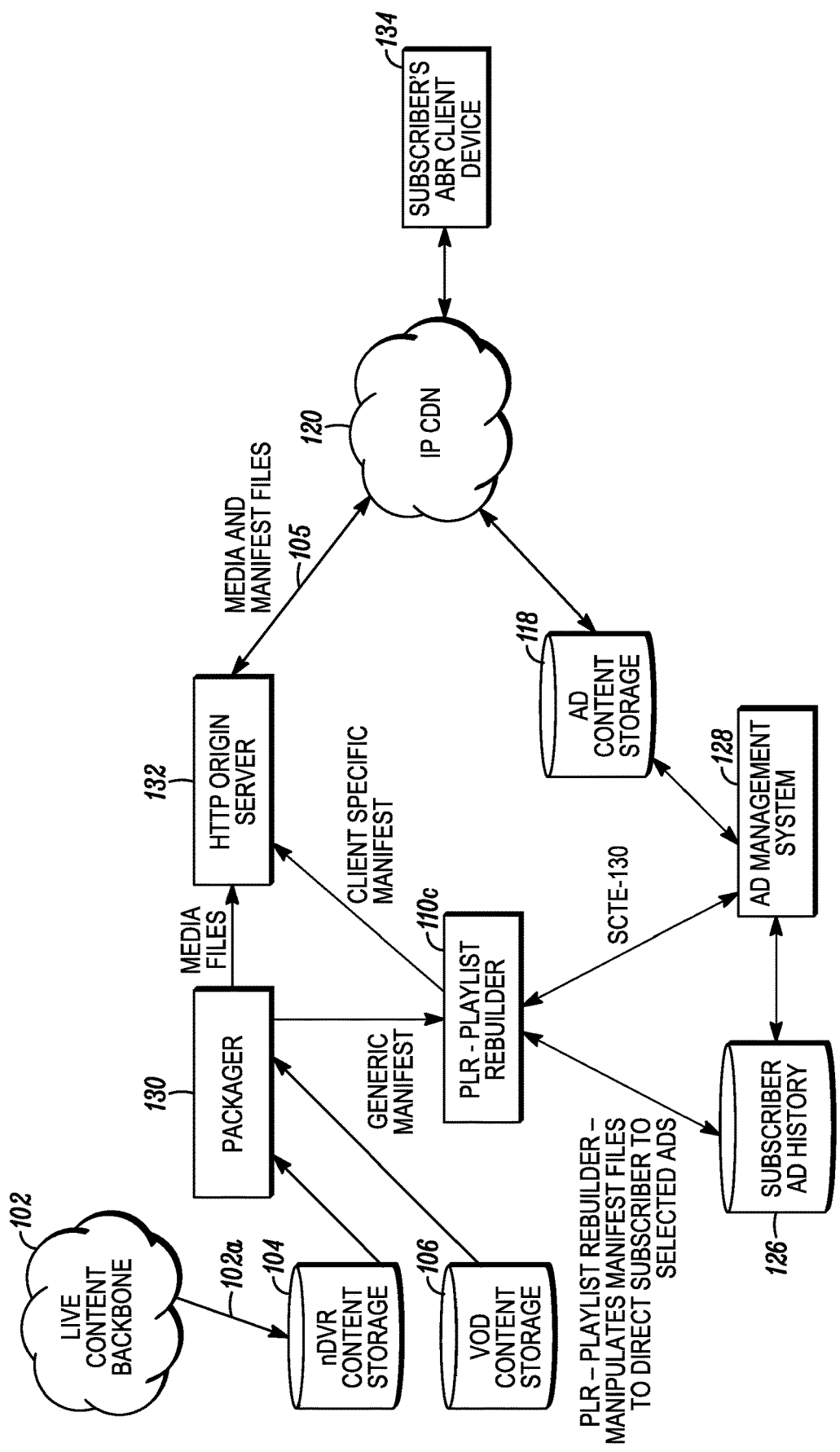
FIG. 1B illustrates components of an example ABR system that utilizes a common copy distribution system.

FIG. 1B illustrates components of an example ABR system that utilizes a common copy distribution system. In this embodiment, the packager, HTTP origin server, and playlist rebuilder are shown separately maintained for each subscriber.

For common copy implementations, the PLR is split off from the packaging function because with common copy there is no user specific packaging (unlike in the unique copy case whereby the JITP may perform the packaging operations on a per client, per session basis). Thus, FIG. 1B illustrates distinct functionality partitioned between the packaging functionality and the client specific operations. In embodiments, the common copy implementation depicted in FIG. 1B applies to general (not client specific) content files.

As shown in the configuration of FIG. 1B, the component that may be client specific is the PLR, which is shown split off from the packaging function. When a specific client requests a specific piece of content, the PLR receives a request from the client for the manifest file (e.g., via the HTTP Origin Server). The PLR receives a generic manifest for the corresponding piece of content from the packager. The manifest file identifies where the ad slots are, and which of those slots are available for ad insertion. Then the PLR may work with the AMS to determine the appropriate ads to be substituted, based on the specific client and specific piece of content. And in response to the appropriate ads for substitution, the PLR will manipulate the manifest file as described herein.

Note that what the PLR does in the common copy case and the unique copy case is generally the same. The difference in these two cases is where is actual packaging of the media files takes place: in the JITP in unique copy case, and in a general packager (separate from the PLR) in the common copy case.

Figure 2:
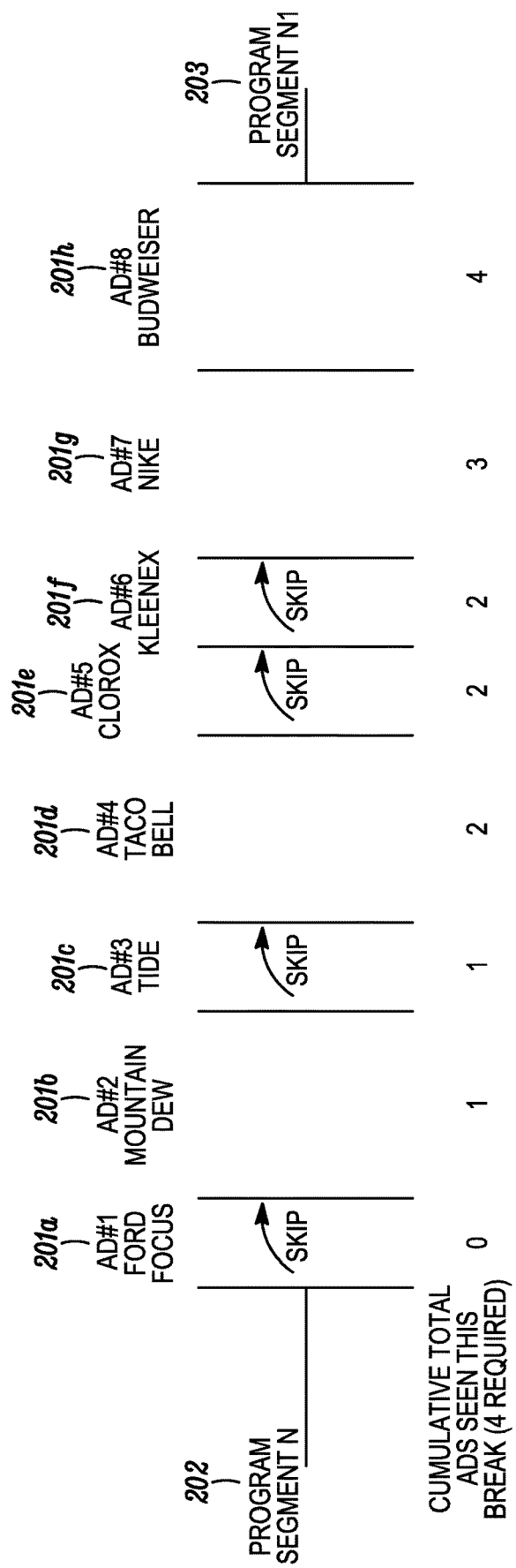
FIG. 2 depicts a representation of advertisement delivery to a subscriber

FIG. 2 illustrates an example of the disclosed techniques. FIG. 2 depicts a an example timeline with a running tally of advertisements, 201*a-h*, representing how the advertisements were delivered to a user. For purposes of discussion, assume the advertisements are all the same length in time. A shorter duration, such as that shown for 201*a*, indicates the ad was skipped by the user. Ad #2, 201*b*, is played in entirety. In this example, assume the ad rules implemented by the service provider required that the subscriber watch a total of four complete ads. As shown by the advertisement run in FIG. 2, the subscriber watched ad #2, 201*b*, ad #4, 201*d*, ad #7, 201*g*, and ad #8, 201*h*.

As shown by FIG. 2, the subscriber can skip past an ad and request in short order (in much less than the playout time for the ad) an update to the playlist (since the client would have reached the end of the content referenced that playlist). Since the request for an updated playlist has come quicker than expected, the packager determines that the client did not watch the first ad, and may not count that ad as having been watched. The packager may then give the client an updated playlist, this time referencing a new ad. If the updated playlist is requested in a 'normal' amount of time (which would be roughly the ad playout time less some buffer fill time), then the packager infers that the ad was watched and increments the ad watched count. This process continues until a minimum number of ads has been watched. All watched and unwatched ads are logged to the subscriber history storage database (with appropriate linkages like subscriber account into, asset metadata and client device).

In contrast to requiring a user to select an ad from several options, the ABR system 100 monitors the subscriber's ad skips to implement better targeted advertisements, keeping a growing history of action or inaction for a particular user for tailoring advertisement selection for the particular subscriber. Thus, over time, the advertisements selected for a particular user will become more fitting. Better ad targeting offers benefits to both the operator, e.g., better revenue from ads viewed, and for the subscriber, e.g., more relevant ad content.

Previous efforts for targeted advertisement use intrusive techniques, such as requesting user information or requiring user action to select an ad from provided choices. Methods that are too probing or invasive will tend to turn off the subscriber. Embodiments disclosed include techniques for more effectively tracking ad preferences and targeting ads to individual subscribers by tracking the user's habits related to skipping or attempts to skip ads. By not invasively requiring a user to select ads, the user's action to skip ads or inaction to not skip ads can be simultaneously used for a second purpose, to refine advertisement selection for the user. Thus, determining the ads to deliver to the user may be accomplished in a manner than is minimally invasive to the subscriber.

The service provider's ability to control advertisement tracking and selection based on the disclosed techniques does not require a client to cooperate with the scheme. In contrast to applications on the client device that are required to cooperate with the service provider network or ABR system in order to implement control of advertisement management, the disclosed techniques do not require cooperation of the client or impose requirements on the client itself. Rather, the disclosed ad management techniques are network-based and do not require a client application or client cooperating with the ad management. In embodiments, a client application or cooperating client may facilitate the disclosed techniques, but is not required. For example, a client application could provide feedback based on other information available via the client device or feedback based on identifying subscriber gestures in the client's physical space that are indicative of a viewed advertisement.

The ABR system may define its ad rules based on criteria it can detect. For example, a minimum number of ads in a given ad break may be expected to be watched by the subscriber. Note that while the ABR system may not know if the subscriber actually views the ad, the ABR system can identify if media chunks associated with the ad were loaded by the client device, and whether the client device attempted to download or did not prematurely download media chunks for subsequent sections of the media content asset. Once the ABR system subscriber watches the minimum number of ads, the subscriber is then directed to the media files associated with the next programming segment.

The subscriber history storage 126 tracks which ads a user watches. The subscriber history storage 126 database may be used to choose future ad placements for that subscriber. The subscriber history storage 126 database may keep as part of these records the subscriber, the asset, and the ads watched. A subscriber may be identified in the history, for example, generally based on a billing account or more specifically a user associated with a particular device using a billing account. In this manner, the ABR system can use the records to infer the specific user on the account that was watching the asset. In other words, there would tend to be a correlation between the asset watched (the type of programming: genre, title, series), the device used to watch that asset, and the ads watched. The system uses the history to link ad preferences to a person as much as possible or at minimum to an account number.

The inference that a subscriber did not watch a particular ad, identity that the subscriber skipped the ad, or the expiration of the playout time, may all be indicators of a subscriber's interest. The correlation stored between a subscriber and the advertisement may be a correlation between the subscriber and the category of the advertisements. For example, if the advertisement skipped was for a car, the system may store an indicator for the subscriber that broadly defines that car advertisements are not selected for the subscriber. However, as the client participates in further ad skipping, the client may only skip certain models of cars, but does not skip other models. Thus, the criteria for ad selection may be refined to include certain models of car advertisements to be an option for selection for the client.

The advertisements may be categorized into a tree of classes, subclasses, subclasses of the subclasses, etc. The more ad skipping activities compiled for a subscriber, the more refined the advertisements may be defined for selection for the particular user.

The history for a particular subscriber may be tied to a billing account, and therefore information for any users of the account may be included in the account history. However, where different users and user interests are often tied to a single account, the system may more specifically identify the ad skipping activity associated with a specific client device accessing content through an account. For example, cell phones are typically registered to a single individual, so activity on a client's cell phone may dictate future advertisements delivered to that cell phone. In another example, subscriber activity is determined based on the programming content viewed on a device such that the advertisements selected are session-based. For example, if a cartoon or children's show is selected for viewing, the ABR system may select advertisements based on similar ad skip activity during previous views of similar programming content. In another example, if episodes of a certain television series are viewed regularly, the ad skip activity during the playback of those episodes may be stored and used to select advertisements for the ad breaks during forthcoming playback of episodes.

Figure 3:
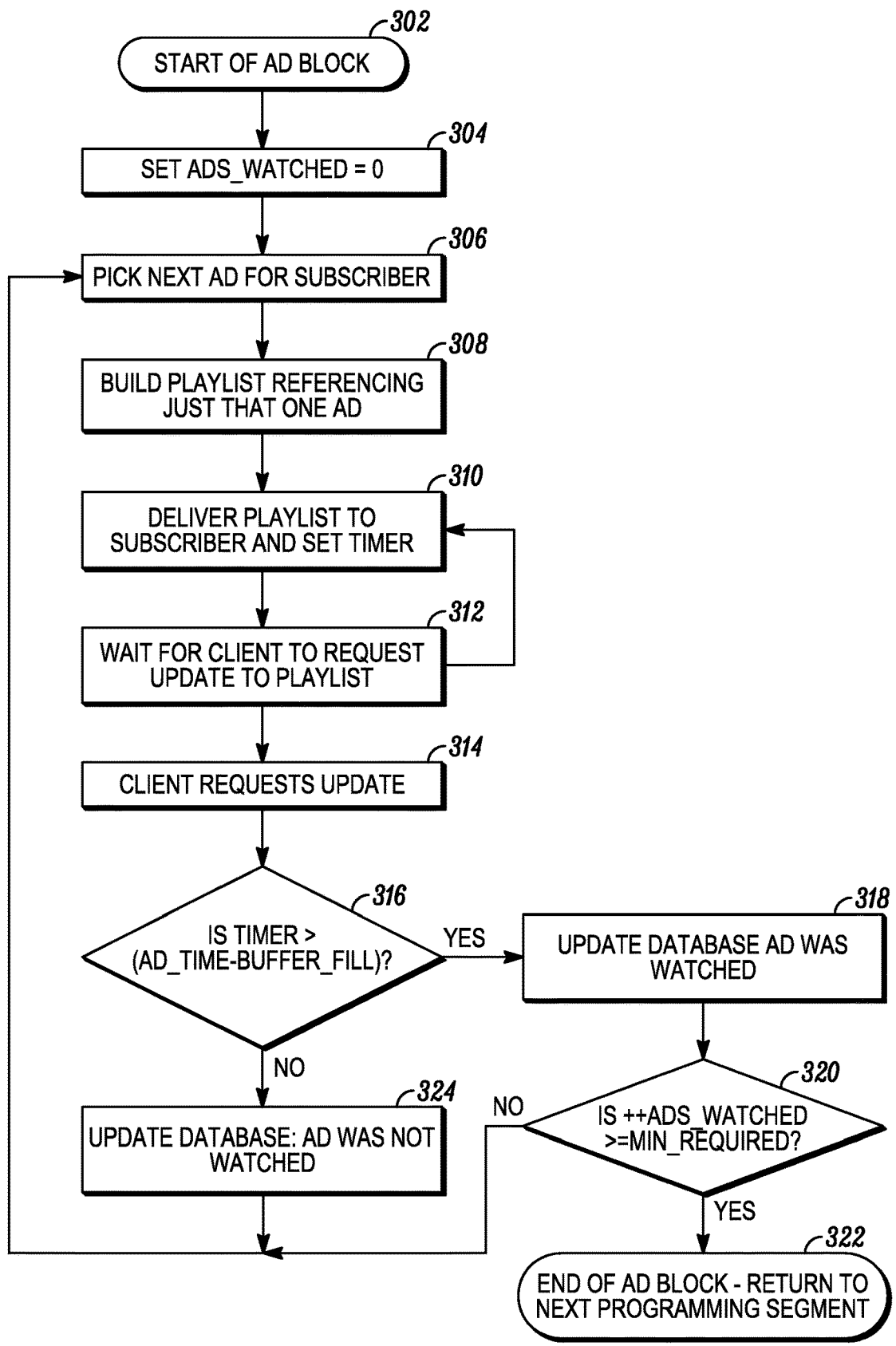
FIG. 3 depicts a flow diagram of an algorithm for implementing the disclosed ad management techniques.

FIG. 3 depicts a flow diagram of an algorithm for implementing the disclosed ad management techniques. The start of an ad block is indicated at 302. Referring back to FIG. 2 as an example, ad block may be represented by the period following Program Segment N, 202, which is associated with a particular manifest file. The ad block may be the period between Program Segment N, 202, and Program Segment N+1, 203, i.e., between the delivery/publishing of the respective manifest files.

At 304, the number of ads watched is set at 0. At 306, the ad management system 128 compares the ads that are available from the ad content storage 118, and evaluates the subscriber's history in the subscriber history storage 126. The ad management system 128 selects an advertisement based on the comparison and provides the selection to the playlist rebuilder 110c.

At 308, the playlist rebuilder builds a playlist referencing the advertisement provided to it from the ad management system 126. If more than one ad is identified for the subscriber by the ad management system 126, the playlist rebuilder includes content for a single advertisement when updating or creating the playlist file. The playlist is published to the origin server and is retrievable by a subscriber. At 310, the playlist is delivered to a subscriber. In this example, a playout time is used to identify a triggering event. Thus, a timer is set upon delivery of the playlist to the subscriber to track the time that has elapsed compared to the playout time.

At 312, the ABR system 100 waits for playout time associated with the ad delivered in the playlist at 310 to expire. If no request is made for additional ad content, at 316 the ABR system verifies whether the timer has exceeded the playout time, or the ad_time_buffer_fill. If the playout time has expired, then at 318 the subscriber history storage 126 is updated to indicate the advertisement was watched (or not skipped).

At 320, if the ad rules have been satisfied, e.g., the minimum number of ads have been deemed to be watched, and then the algorithm has reached the end of the ad block at 322 and can return to the next program or programming segment. If at 320 the ad rules have not been satisfied, e.g., the minimum number of ads deemed to be watched by the ABR system has not been met, the algorithm returns to 306 for selecting the next ad for a subscriber provided to the playlist rebuilder by the ad management system 126.

Referring back to 312 and the period in which the ABR system waits for the playout time for a particular ad to expire, the client may request an update to the playlist file during the playout time, i.e., before the timer has indicated that the playout time has lapsed. Thus, the comparison of the timer to the playout time at 316 will result in an update to the database at 324 indicating the client requested that the advertisement be skipped. An alternative ad is selected for the subscriber at 306, assuming that the ad rules implemented by the ABR system have not otherwise been met.

It is noted that, in embodiments, once the subscriber is in the ad break section of the playback, e.g., the time represented at 312 in FIG. 3, the playlist file provided by the packager 110a only references a single ad. This way, if the subscriber attempts to skip past that ad, the client must immediately go back to the packager 110a for an updated playlist. If the ad is instead deemed as watched by the subscriber, then the client will not request an updated playlist as quickly. In this case (that the ad is watched) the client requests from the packager 110a the updated playlist after an amount of time equal to roughly the ad playback time less some buffer filling margin. The difference in playlist request times (e.g., quickly when the ad is skipped vs. not so quickly when the ad is watched) enables the packager 110a to infer whether or not the ad is skipped. In embodiments, the packager 110a could, via a more direct integration with the ad management system 128, monitor whether or not the ad chunks are fetched from the ad content storage 118. While such monitoring may involve extra integration between the packager 110a and the ad management system 128 or storage 118, the embodiment may enable the monitoring if the playlist timing method proves to be unreliable given certain client behavior.

As disclosed herein, the use of a subscriber's natural habit of skipping ads enables the ABR system to gather preferences about the subscriber and to target more relevant ads accordingly. The non-invasive approach is more agreeable for the subscriber that the existing invasive techniques.

The ad management techniques may implement solutions for providing a balance between providing the subscriber with some understanding about the non-invasive ad monitoring, while informing the subscriber of the ad rules, such as the number of ads that needs to be watched in each break.

In embodiments, the ABR system 100 displays a message at the start of an ad break identifying a minimum number of ads to watch. In embodiments, the ABR system 100 may display a running count of ads left to watch during the ad break. In embodiments, the ABR system 100 can simply stop queuing ads after some large number of ads have been skipped. Once the subscriber has learned the functionality, the system may turn off or stop showing these ad count messages. In embodiments, limited ad skipping is encouraged by forcing fewer ads on those who skip some ads compared to those who don't skip any.

The disclosed techniques include subscriber participation in some ad skipping, such as skipping those ads that are not relevant. To encourage the skipping behavior to expand on the subscriber's history for better ad selection, subscribers who from time to time skip ads may have more relaxed ad rules, such as being required to watch fewer overall ads than subscribers who do not participate in the ad skipping.

In contrast to explicitly requiring a user to select between ads to view, the lean back experience supported by the disclosed ad management techniques is desirable by many consumers. The disclosed techniques of limited ad skipping are considered 'lean back' TV experience, For example, embodiments are disclosed herein that rely on user actions or inactions (e.g., fast forwarding or skipping past ads), to which most users are already habituated. Because users often skip ads naturally, ad skipping participation with the disclosed techniques will be more likely than participation in ad skipping that invasively requires an ad choice for ads that may not include any ads of interest to the user, and implicates a requirement by the subscriber to opt in or opt out, or incorrectly emphasizing a particular ad content solely because it was selected out of three choices irrelevant to the subscriber.

FIG. 4 depicts a flow diagram illustrating a method for preventing or minimizing ad skipping when on demand content (e.g., VOD or nDVR content) is requested from an adaptive bit rate client. Referring also to FIG. 3, the start of the ad block 302 illustrated in FIG. 3 corresponds to 412 in FIG. 4, which represents the start of a playback duration of an ad break 412 in an implementation for limiting ad skipping.

As described in more detail below, the packager 110a may prevent or limit ad skipping for subscribers by limiting the adaptive bit rate client's knowledge of the media files (via limiting the references in the manifest/playlist). At 402, a subscriber makes a request for an on demand asset from an adaptive bit rate system. As shown in FIG. 1A, in embodiments, the sources of on demand content may be the nDVR content storage device 104 or the video on demand content storage device 106. For example, the on demand asset may be a movie or a television program recorded in the nDVR storage device 104 and selected for playback or a movie or a television program available through the service provider and selected from the video on demand content storage device 106. While nDVR and VOD content is described, on demand content may include any content that is not delivered live to the user or is otherwise stored by the adaptive bit rate system and available upon request.

The delivery of nDVR or VOD content by the adaptive bit rate system 100 to a subscriber over the IP CDN 120 may be via a path that includes a just-in-time packager 110a and HTTP origin server 110b. In embodiments the just-in-time packager 110a receives HTTP requests for manifest files directly from adaptive bit rate clients, and the just-in-time packager 110a is used only to satisfy a specific client session based on that request. Further, the just-in-time packager 110a processes content in real time in response to an individual client request, and packages content specific for that individual client. For example, the content may not be immediately packaged upon receipt from the live content backbone 102 and may not be available for request from a multitude of users. In fact, some on demand content may never be requested and therefore does not get packaged. The just-in-time packager 110a is thus well-suited to satisfy requests for on demand content like VOD or nDVR.

The just-in-time packager 110a generates a manifest file that may be carefully constructed to minimize ad skipping by the client. Because fetching and displaying segments is under client control in adaptive bit rate system, an adaptive bit rate client device may request any content segment described in the manifest or playlist. The control by the client makes it difficult to enforce client behavior from the server as is possible in push mode delivery systems (i.e. traditional VOD over QAM or IPTV). The just-in-packager 110a includes a mechanism for preventing, or at least dissuading, viewers from skipping ads when viewing content delivered by an adaptive bit rate system.

As described herein, adaptive bit rate streaming functions to break the overall media stream into a sequence of small file downloads, each download loading one short segment, or chunk, of an overall potentially unbounded transport stream. An asset file may include several periods separated by ad breaks. The segment lengths for either of the media periods or ad breaks may vary, and may be a function of the length of the asset/ad and the adaptive bit rate streaming characteristics. The timeline for an asset file may have a different number of periods, a different number of segments in each period, and a different number of ad break periods from what is shown. For example, differently encoded files for a given on demand asset may be segmented differently. The asset file and the ad breaks may be segmented in to any suitable length.

At 404, the just-in-time packager 110a identifies a first period in at least one of a plurality of differently encoded files of a requested on demand asset. The first period is associated with the request for the on demand asset, i.e., the period within which an adaptive bit rate media segment associated with the request for the on demand asset is located.

At 406, an ad break associated with the first period is identified. There are multiple ways for the just in time packager 110a to identify locations of the ad breaks. For example, in embodiments the packager may parse SCTE-35 messages carried within the MPEG transport stream of the inbound stream. SCTE-35 messages identify the splice in and out points (i.e., the ads). In embodiments, the packager locates the ad blocks using metadata for the stored asset, such as an index file or a DASH manifest file that may have been created and stored by the VOD or nDVR ingest/recording subsystem. The packager may use any reliable mechanism to identify where in the content stream the ads can be found.

At 408, the manifest file generated by the adaptive bit rate system references adaptive bit rate media segments that occur within the first period. The packager generates a manifest file to lists the contents of a distribution, providing a table of contents of the video identifying the different representations of the requested on demand asset available to the requesting adaptive bit rate client device. In this manner, the manifest file gives multiple versions of the requested adaptive bit rate media segment for selection by the user based on the adaptive bit rate client device capabilities. The server may initially send the client the manifest file to enumerate the files which are included in a distribution.

The manifest file, therefore, limits access by the adaptive bit rate client device to media segments in the first period; the adaptive bit rate client does not initially have access to content in other periods, or ads. Accordingly, the adaptive bit rate client device cannot perform trick plays on content in the other periods, but only on content within the single period for which the manifest file includes references. The viewer can navigate (e.g. fast forward, rewind) within this initial period, but to play into the next period the adaptive bit rate client device has to request an updated manifest containing additional content.

The appendage to the manifest file with references to ad content at 410 may occur following an indication that the adaptive bit rate client device has received the desired media segments from the first period. Thus, in embodiments, it is not until an indication that the desired adaptive bit rate media segments during the first period have been retrieved or fast forwarded through, that the adaptive bit rate system, at 410, appends references to ad content associated with an ad break associated with the first period to the manifest file.

An indication that the adaptive bit rate client device has received the desired media segments may be an indicator provided to the packager. For example, the adaptive bit rate client device may have played through all of the media segments in the first period and is requesting additional media segments from a second period for continued playback for a user. The indication may be an indicator that the adaptive bit rate client device has fast-forwarded to the end of the available media segments in the first period. The indication may be an indicator that the adaptive bit rate client device has initiated a fast-forward function or a rewind function to retrieve content from a second period where the second period occurs either after the first period or prior to the first period. The indication may be a request for media segments from a second period in the differently encoded files of the on demand asset.

Somewhat incidental to the carefully constructed manifest files is the fact that in embodiments, as illustrated in FIG. 1A, the ad content may be stored pre-packaged in an ad content storage 118 location, a location that may be separate from the programming content (e.g., content stored in nDVR and VOD storage servers). The pre-packaged ad content may not need to pass through the just-in-time packager 110a, rather the manifest (i.e. playlist) files created by the just-in-time packager 110a reference the ad content (in addition of course to the programming content) even though the just-in-time packager 110a does not directly chuck the actual ad content (i.e. the ad content is pre-chunked). To change the ads dynamically, the manifest file listing the ads could be deleted and a placeholder can be filled with ads from ad content storage 118.

In embodiments, the ad may be inserted in to the on demand asset or stored with the on demand asset in the adaptive bit rate system, such as in nDVR storage device 104 or VOD content storage device 106. Thus in embodiments, ads may be packaged with the on demand asset and served by an HTTP origin server. For example, VOD content typically includes content selected by a content provided for being available to a user on demand, and the ads are already saved in to the stream. Similarly, a recorded content on a nDVR may include a recording of the ads that played at the time of the live stream.

Once the manifest/playlist is updated with the references to the ad content at 410, the just-in-time packager 110a will not update the manifest/playlist with references to the content following the ads until the full playback duration of the ad break has expired. Following an expiration of the playback duration of the ad break at 412, the adaptive bit rate system appends references to adaptive bit rate media segments that occur within a second period of the on demand asset. Thus, the adaptive bit rate system limits the adaptive bit rate client device, by way of the manifest file, to media segments in the first period until a playback duration of an ad break associated with the period expires at 412.

Logic in an edge server can enforce that the new, post-ad manifest file cannot be fetched until the duration of the ad break has expired at 312. For example, in the case of nDVR and VOD content, when the subscriber first goes to watch an on demand asset, e.g., a 2 hour program with 15 minute periods, the subscriber will receive media segments for the first 15 minutes of the on demand asset and then be forced to wait for an ad break playback duration to expire before being provided additional media segments from a subsequent 15 minute period of the on demand asset.

The adaptive bit rate system 100 may post media segments to an origin server that correspond to the media segments referenced in the manifest file. Thus, the media segments posted to the origin server are updated to match up to the media segments referenced in the current manifest file. For example, media segments corresponding to those referenced in the manifest file at 408 (limited to references to media segments in the first period.) are posted to the origin server at 416. At 418, media segments corresponding to the manifest file updated at 410 (including the reference to ad content in the ad break) are posted to the origin server (in embodiments, with the I-frame playlists omitted). At 420, media segments corresponding to the manifest file updated at 414 (with references to content in a second period of the on demand asset) are posted to the origin server.

The disclosed techniques enable the network operator to support trick play to some extent on the on demand content so the subscriber is able to freely pause, and fast forward and rewind through the programming portions (but not fast forward past the ads). Note that the subscriber is allowed to freely pause, fast-forward and rewind through all the programming segments, but once the subscriber tries to move to the next section of programming (across an ad break), the subscriber is forced to wait the playback duration of the ad block until the chunks for the next programming block are made available (as indicated via references in the manifest file). During this time, the client may or may not actually watch or even fetch the ad content, but by stalling the manifest file at the ad block, the chances that the subscriber actually watches the ads are increased.

As shown in FIG. 1A, in embodiments the HTTP origin server 110b is built in to the just-in-time packager 110a. The all in one embodiment is intended to handle one subscriber at a time per asset. Thus, the combined origin server and just in time packager server clients individually. Based on the manifest file requests, the just-in-time packager 110a in real time will fulfill these requests and create the requested manifest files and will post the associated media chunks to its internal origin server 110b.

While FIG. 1A depicts an example just-in-time packager and HTTP origin server 110b, a plurality of just-in-time packager packagers with built in HTTP origin servers may be employed in the adaptive bit rate system 100 to serve a plurality of users. Thus, while the just-in-time packager serves multiple users, each user accesses a different asset. For example, if the just in time packager can perform fifty (50) packaging jobs, then the just-in-time packager can support fifty (50) users.

The packager 110a may also support a playlist rebuild (playlist rebuilder) function for generating and/or rebuilding an adaptive streaming manifest file. In embodiments, the packager 110a can change how the manifest file is exposed to the subscriber via the playlist rebuilder 110c. The function of the playlist rebuilder 110c is to receive a single manifest or play list file from a packager 110a and manipulate the manifest by modifying parts of it, creating one or more different manifest files for the same piece of content. The rebuilt manifest files are published to one or more servers 110b along with the content. As described in FIG. 4, the rebuilt manifest files may be rebuilt to correspond to the adaptive bit rate media segments that are made available to the user, such as the manifest file built at 416, then updated (either revised or appended to) at 418, and again at 420 and 422.

The playlist rebuilder rebuilds playlists, e.g., the rebuilder manipulates manifests. The packager may receive ad content and perform segmentation as well. In embodiments, the packager/playlist rebuilder receives segments for ad content from the ad content storage 118 and builds the manifest file using the received ad segments. In embodiments, the packager/playlist rebuilder receives ad content and performs the segmentation of the ad content. In embodiments, the packager/playlist rebuilder does not segment the ad content but may build the manifest files with ads from the ad content storage 118. In embodiments, the packager/playlist rebuilder inserts ad content received from the ad content storage 118 in to the manifest file to be delivered with the media segments. In embodiments, the packager/playlist rebuilder replaces ad content in the asset file received from the nDVR content storage 104 or VOD content storage 106 with ad content/segments received from ad content storage 118.

The playlist rebuild function 110c may be embedded within the packager 110a, as shown in FIG. 1A, or it may be an external function depending on the implementation. To support either the internal or external playlist rebuilder 110c, the packager may insert additional metadata or extension fields into the manifests created during the chunking operation. The playlist rebuilder 110c can use the additional metadata to perform its functions and may or may not drop (based on configuration) the additional metadata before publishing the playlists/manifests to a server.

A playlist rebuilder 110c may be used for content substitution applications such as, but not limited to, ad-insertion, black out substitution, and EAS message propagation/substitution. The playlist rebuilder may be configured to manipulate manifest files to direct a subscriber to selected ads. The playlist rebuilder 110c may be used to perform manifest obfuscation so as to make ad-avoidance of advertisements more difficult. For example, playlist rebuilder 110c can receive an initial manifest file from the just-in-time packager 110a and use the received initial manifest file to generate a rebuilt manifest file based on the techniques disclosed. The playlist rebuilder can start with a manifest file that encompasses the entire program or on demand asset, and break it down in to pieces based on the ad breaks. The manifest file received by the playlist rebuilder 110c from the packager 110a may contain metadata or proprietary extensions inserted by the packager 110a that allows the playlist rebuilder to easily process the manifest file by helping the playlist rebuilder identify locations of ads or start and end of content that needs to be substituted.

Figure 5:
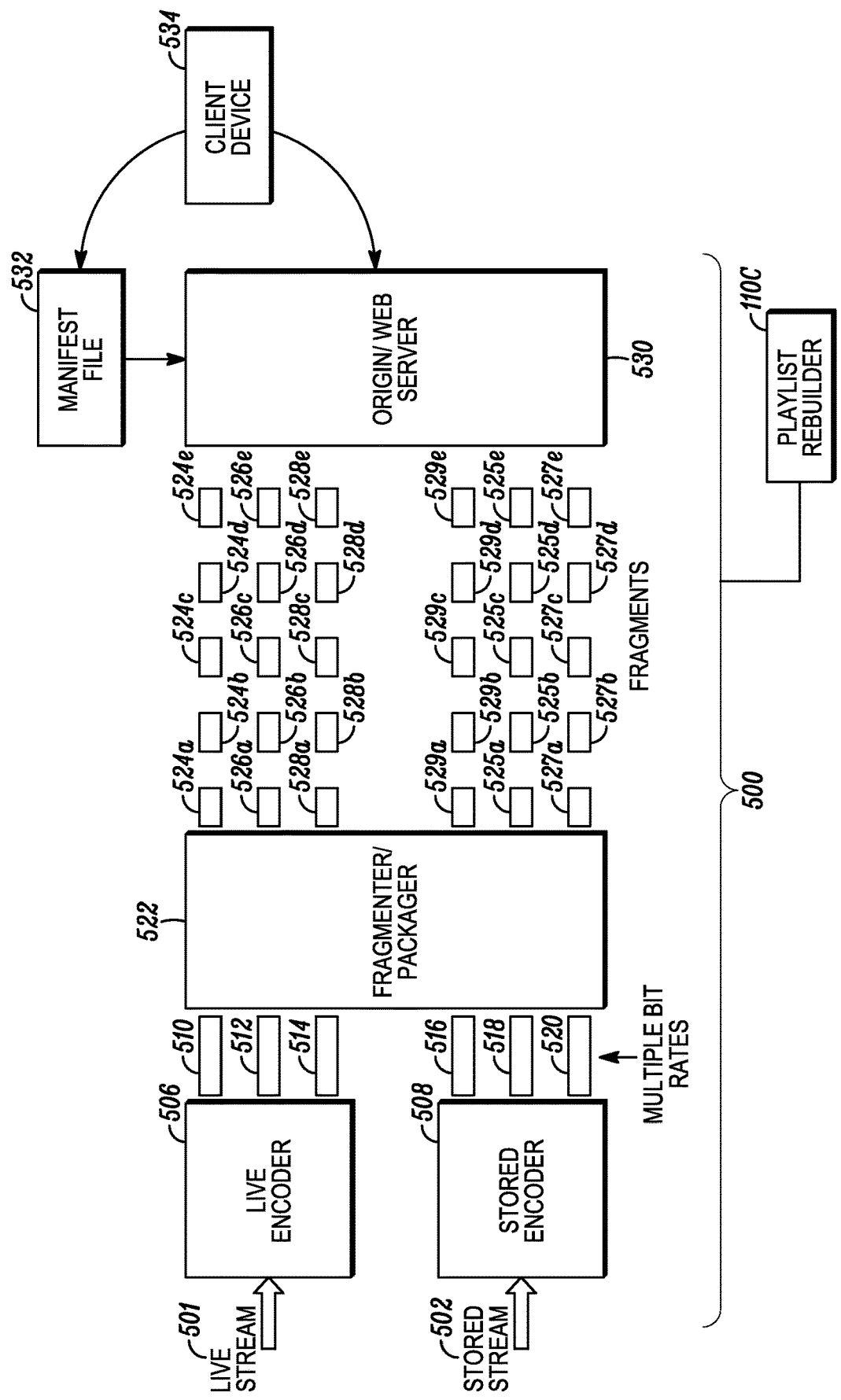
FIG. 5 illustrates components for example components in an adaptive bit rate streaming system.

FIG. 5 illustrates components for implementing adaptive bit rate streaming that can be used with the disclosed techniques for preventing ad skipping. A packager 500 includes an encoder 506 or 508, a fragmenter 522, and a web server 530 (e.g., HTTP streaming server). The packager 500 outputs a manifest file 532 for adaptive bit rate metadata. The adaptive bit rate system delivers the manifest file and corresponding content using adaptive bit rate techniques to an adaptive bit rate client device 534.

Adaptive bit-rate streaming is a technique for streaming multimedia where the source content is encoded at multiple bit rates. Adaptive streaming, also known as adaptive bit rate (adaptive bit rate) streaming, is a delivery method for streaming video over Internet Protocol (IP). It is based on a series of short Hypertext Transfer Protocol (HTTP) downloads which is applicable to the delivery of both live and on demand content. It relies on HTTP as the transport protocol and performs the media download as a series of very small files. The content is cut into many small segments (chunks) and encoded into the desired formats. A chunk is a small file containing a short video segment (typically 2 to 10 seconds) along with associated audio and other data. Adaptive streaming uses HTTP as the transport for these video chunks.

Adaptive bit rate techniques enable the content delivery system to detect a user's bandwidth and optionally other capabilities, such as CPU capacity, in real time and adjust the quality of a video stream accordingly. It uses an encoder which can encode a single source video at multiple bit rates. The client switches between streaming the different encodings depending on available resources. The result: very little buffering, fast start time and a good experience for both high-end and low-end connections.

Many solutions for preventing ad skipping require a trusted client device (i.e., a client device that is nominally under control of the network operator or service provider) that can prevent ad skipping after the content has been delivered to the client device. For example, a trusted client device can employ software when playing back content recorded at the client device that prevents third party software from interrupting the display of ads in the content. Governing the ad content in the client itself, such as by putting tags in the content and having the client device force behavior, is not always available. For example, you can see in the playbar where the ads will appear, and the client device will control access to the ads from the client device control.

In the adaptive bit rate environment, however, network operators often have less control over the client, since clients are deployed across a wide variety of consumer devices (e.g., iPad, iPhone, Android tablets, Kindle Fire, etc.). Further, adaptive bit rate systems are open to increased risk because of how client devices access media files from the network. In particular, the nature of adaptive bit rate, with clients pulling chunks of media files/segments as needed, allows for much more 'free form' access to media that would tend to allow for freedom for the client to skip ads. Solutions developed for existing distribution networks for preventing ad skipping have deficiencies when deployed in adaptive bit rate environments.

Disclosed herein are network based techniques for preventing the skipping of ads, suitable also for adaptive bit rate environments. In embodiments, the methods are managed by the network on the network delivery side of the adaptive bit rate system and is device agnostic. Thus, in embodiments, the techniques disclosed do not require a cooperative client (in other words, the client may have control to attempt to skip the ads, but attempts to skip ads may be thwarted by the network per the implementation of the disclosed techniques). The techniques disclosed may prevent a user from skipping advertisements when using adaptive bit rate by changing the way manifest files are created (client specific) and exposed to the client (based on ad breaks).

The client device may request fragments of video from the server for playback at the client device. Since adaptive bit rate fragments are available on the server in one of several bit rates, the client may switch bit rates at the fragment boundaries. Thus, the client can adjust its request for the next fragment. The result is a system that can dynamically adjust to varying network congestion levels. Often, the quality of the video stream streamed to a client device is adjusted in real time based on the bandwidth and CPU of the client device. For example, the client may measure the available bandwidth and request a fragment that best matches a measured available bit rate.

As shown in FIG. 5, the live stream 502 and stored stream 504 may be input to a real-time encoder or an on demand just-in-time encoder, 506, 508, respectively. The encoder converts whole content streams in to multiple streams at different bit rates. For example, an encoder is responsible for taking an MPEG stream (e.g., MPEG-2/MPEG-4) or a stored MPEG stream (e.g., MPEG-2/MPEG-4), encoding it digitally, encapsulating it in to MPEG-2 single program transport streams (SPTS) multiple bit rates formats, and preparing the encapsulated media for distribution. The live stream 502 may be encoded into three transport streams, 510, 512, 514, each having a different bit rate. The live stream 502 may be a broadcast of multimedia content from a service provider. The stored stream 504 is transcoded in to three transport streams, 516, 518, and 520, each having a different bit rate. The stored stream may be on demand content, for example.

The resultant transport streams 510, 512, 514, 516, 518, and 520 are passed through a fragmenter 522. The fragmenter 522 reads each encoded stream 510, 512, 514, 516, 518, and 520 and divides them in to a series of fragments of a finite duration. For example, MPEG streams may be divided into a series of 2-3 second fragments with multiple wrappers for the various adaptive streaming formats (e.g., Microsoft Smooth Streaming, APPLE HLS).

As shown in FIG. 5, the transport streams 510, 512, 514, are fragmented by fragmenter 522 into adaptive bit rate media segments 524a-e, 526a-e, and 528a-e, respectively. The resultant transport streams 516, 518, and 520, are fragmented by fragmenter 522 into adaptive bit rate media segments 530a-e, 532a-e, and 534a-e, respectively. The fragmenter 522 is also referred to herein as a packager, as the packager can include fragmenting the content into fragments and then encrypting each fragment using a content key.

The packager 500 can generate a manifest file that represents a playlist. The playlist can be a manifest file that lists the locations of the fragments of the multimedia content. By way of a non-limiting example, the manifest file can comprise a uniform resource locator (URL) for each fragment of the multimedia content. If encrypted, the manifest file can also comprise the content key used to encrypt the fragments of the multimedia content The packager may facilitate adaptive bit rate streaming of video and audio to multi-screen video (MSV) clients. The packager may be a software element residing on a multirate transcoder. The packager may co-exist with a HTTP server, a streaming Edge Server, or may be a standalone appliance. Further the packager may optionally have a built-in content delivery network interface or an HTTP server interface such that it can support clients directly. Direct support of clients may be limited to VoD and nDVR type applications.

The discrete segments may be delivered using common Internet protocols, namely HTTP over TCP/IP, a robust and reliable transfer protocol in which clients request content segments and web servers respond accordingly. Thus, within an embodiment of an adaptive bit rate system, knowledge of all content segments delivered and to whom they are delivered can be provided for use in network-based viewership monitoring.

As described herein, the types of content that the packager may package includes Live Linear, VOD, StartOver, and nDVR. VOD content and nDVR content were described above. Live content are television programs that are watched in real time. This means that packaging must be an ongoing process that occurs simultaneously with playback. StartOver contents are live content whose viewing can be started after the content start time. You can for example at 7:15 PM start watching a 7:00 PM live program.

Per service the packager will be configured to perform segmentation/chunking for either all output adaptive bit rate formats or a subset of the output adaptive bit rate streaming formats. The packager will also create the respective manifest files. The chunk durations may be different for each adaptive bit rate format, but they will all have to be an integer multiple of the GOP size or key frame intervals. However for a given adaptive bit rate format the chunk durations will be the same for all streams in an output stream group.

The packager may be a logical software service which can run on various hardware platforms, located at various points in the network. In general it either lives "in the center" or "at the edge". In a center deployment it may be logically positioned between the Transcoder and the origin server. In an edge deployment it is logically positioned between the origin server and the Edge Server.

The packager shall further support ad-insertion, blackout/content substitution, and EAS via playlist manipulation. The actual playlist manipulation may or may not be performed by the packager.

In centralized packaging the transcoder and packager may be co-located. The transcoder may directly feed multibitrate streams into the packager. The packager performs its packaging function and publishes the adaptive bit rate streams to one or more servers downstream from it. In both instances of remote packaging the packager is separated from the transcoder by some type of an IP network. In the distributed packaging instance the transcoder and packager may be separated by a multicast routable IP network. In such a network the transcoder outputs multicast SPTSs that are routed directly to one or more distributed packagers. The packagers ingest these multicast transport streams perform the packaging function and publish adaptive bit rate streams to servers downstream from them. In the final case of edge packaging the transcoder and packager are separated by a content delivery network. The transcoder publishes content to the origin server of a content delivery network between the transcoder and packager. The packager uses HTTP methods to retrieve this transcoded content from the origin server. After packaging the adaptive bit rate streams are published to downstream servers for being streamed to clients upon request. Downstream from the packagers and the servers to which they publish adaptive bit rate streams, clients are typically served by MSO's DOCSIS based access networks or Telco's DSL or PON based access networks. The packager will be capable of supporting live linear content, Video on Demand (VoD), and network Digital Video Recorder (nDVR) content.

After fragmentation, the fragments and manifest files (list of assets fragment) are placed on a content delivery network server. The content delivery network logic stores the fragments according to an internal heuristic logic algorithm, determining whether and where to store the content. For example, more popular content may be stored in local storage to decrease network bandwidth usage and increase access speed. Less popular content may be stored in a central repository to reduce costs for fast storage. For example, content that may be stored includes on demand and network DVR content. Live non-DVR content fragments may be distributed by the content delivery network but not stored.

HTTP is a manner for retrieving files from the Internet and the technology is built into web browsers. HTTP has more recently become a preferred method to deliver video. It can be used to deliver video in an adaptive streaming manner in which the video is encoded into various bit rates and fragmented for delivery. Business rules, such as network congestion or processor utilization, are used to determine which bit rate is delivered at what time.

The disclosed packager supports adaptive bit rate streaming in any container formats. Examples of these adaptive bit rate video container formats include HTTP Live Streaming (Apple—HLS), Internet Information Services—Smooth Streaming (Microsoft—HSS), and HTTP Dynamic Streaming (Adobe—HDS). The container formats have become de-facto industry standards due to their widespread use. The disclosed packager also supports profiles from the MPEG-DASH (Dynamic Adaptive Streaming over HTTP) format, which is a standardized adaptive streaming specification that has been developed as an industry standard by MPEG. This system could be implemented in MPEG DASH without any special logic in the client and most likely in existing proprietary adaptive bit rate schemes. This is a novel use of dynamic manifests to control client behavior, in particular to minimize ad skipping.

An illustrative adaptive streaming system 100 may implement, for example, one or more open or proprietary protocols for adaptive bit rate streaming such as HTTP Live Streaming (HLS), SecureMedia's Encryptonite One HLS+ solution, Microsoft Smooth Streaming, HTTP Dynamic Streaming, Dynamic Adaptive Streaming over HTTP (DASH), HTTP Smooth Streaming (HSS), and the like. The packager converts one or more multi-bit rate streams of an input stream group into logical files formatted for a particular output streaming format such as HLS, HDS, HSS or DASH. In HSS, HDS and DASH all of the chunks associated with a given format and bit rate are stored within the same file. In HLS however, each chunk is stored in its own file. So assuming two second chunks, three bitrates and 30 minute program the packager will create three HSS files but 2700 HLS files. The packager can create multiple formats simultaneously. Each format to be generated is specified by a profile.

Apple HLS breaks the whole content stream in to a sequence of small HTTP based file downloads. As the stream is played, the client selects from a number of different bit rate streams based on the client CPU and bandwidth.

Microsoft HSS is a media services extension to enable adaptive streaming of media to clients over HTTP, using a concept of delivering small content fragments (e.g., 2 seconds video) and verifying that each has arrived within appropriate time and playback at the expected quality level.

Overall quality with adaptive bit rate may be the best possible for a given user's network connection, thereby maximizing the quality of experience.

To conserve network bandwidth, video file fragments can be multicast. With multicast, a single source sends data to multiple destinations at one time. Each TV channel has its own multicast. A multicast will only be joined when requested from a subscriber. Multicast makes the routers replicate fragments only when necessary (see FIG. 5). If the multicast is not already joined in a service group, then the first join from any subscriber in that service group starts it, similar to how SDV works. IP VOD delivery, though, is unicast but can the leverage the multiple bit-rate encodings to provide adaptive streaming. With this approach, the bit rate can change dynamically providing a method to manage network bandwidth. This removes the need for more formal Quality of Service (QoS) and session management solutions. Priority can be given to transactional requests to offer the highest quality video. This is a much simpler method of QoS and session management than conventional methods such as PCMM In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

I claim:

1. A network-based method for ad management in an adaptive bit rate network, the method comprising:
   generating a manifest file referencing a series of adaptive bit rate media segments of at least one of a plurality of differently encoded versions of a programming content for retrieval by a client's adaptive bit rate client device during a streaming session,
   selecting a first advertisement using a network-based management system for providing to the client's adaptive bit rate client device;
   providing the first advertisement content to the adaptive bitrate client device;
   selectively allowing the first advertisement to be skipped relative to other advertisements provided to the client device during the streaming session that are not allowed to be skipped; and
   determining whether an advertisement was skipped by monitoring a just-in-time packager that provides the adaptive bitrate media segments to the client device; and
   identifying a second advertisement to provide to the client device based on the content of the first advertisement and an identification of whether the first advertisement was or was not skipped by the client device.

2. The method of claim 1, wherein identifying whether the adaptive bit rate client device skips the first advertisement is identified based on a request by the client device to receive additional programming or advertisement content media segments.

3. The method of claim 1, further comprising setting a timer that compares the time elapsed to the playout time for a respective advertisement.

4. The method of claim 3, further comprising identifying a non-skip action of the first advertisement if the playout time expires without a skip of the first advertisement.

5. The method of claim 3, wherein a non-skip action is correlated to the first advertisement.

6. The method of claim 1, wherein a non-skip action of an advertisement is correlated with the respective non-skipped advertisement in a subscriber history storage.

7. The method of claim 6, wherein the correlation stored in the subscriber history storage is an indicator of a client's preferences for advertising content, wherein the correlation links the subscriber to a non-skipped advertisement or information associated with the non-skipped advertisement.

8. The method of claim 6, wherein the correlation stored in the subscriber history links the client to information associated with one or more advertisements including at least one of a category of advertisements, a genre of advertisements, or a date range or age of advertisements.

9. The method of claim 6, wherein the correlation stored in the subscriber history links the programming content with one or more advertisements including at least one of a category of advertisements, a genre of advertisements, or a date range or age of advertisements.

10. The method of claim 9, wherein manifest file references to a second advertisement content are appended to the manifest file if at least one of the following:
the first advertisement is skipped,
ad rules have not been satisfied,
the ad break has time remaining, or
the playout time is interrupted.

11. The method of claim 1, further comprising waiting for a playback duration of the ad break to expire before appending to the manifest file references to adaptive bit rate media segments that occur within a second programming content period of the at least one of the plurality of differently encoded files of the programming content.

12. The method of claim 1, wherein any future advertisement selections for a client or client device are made with reference to the history for the client or the client device compiled in the subscriber history storage.

13. The method of claim 1, wherein the manifest file and segmentation of the programming content into media segments occurs in a just-in-time packager for a unique copy or in a general packager separate from a playlist rebuilder for a common copy.

14. The method of claim 1, wherein upon a determination of a user action or the expiration of a playout time, identifying if ad rules have been satisfied.

15. The method of claim 1, wherein one or more advertisement contents are made available one at a time to the client during an ad break by appending media segments associated with a respective one of the one or more advertisement contents until the ad break has expired or until ad rules have been satisfied.

* * * * *